(No Model.)
J. L. WILSON.
SCROLL SAW.
No. 536,980. Patented Apr. 2, 1895.
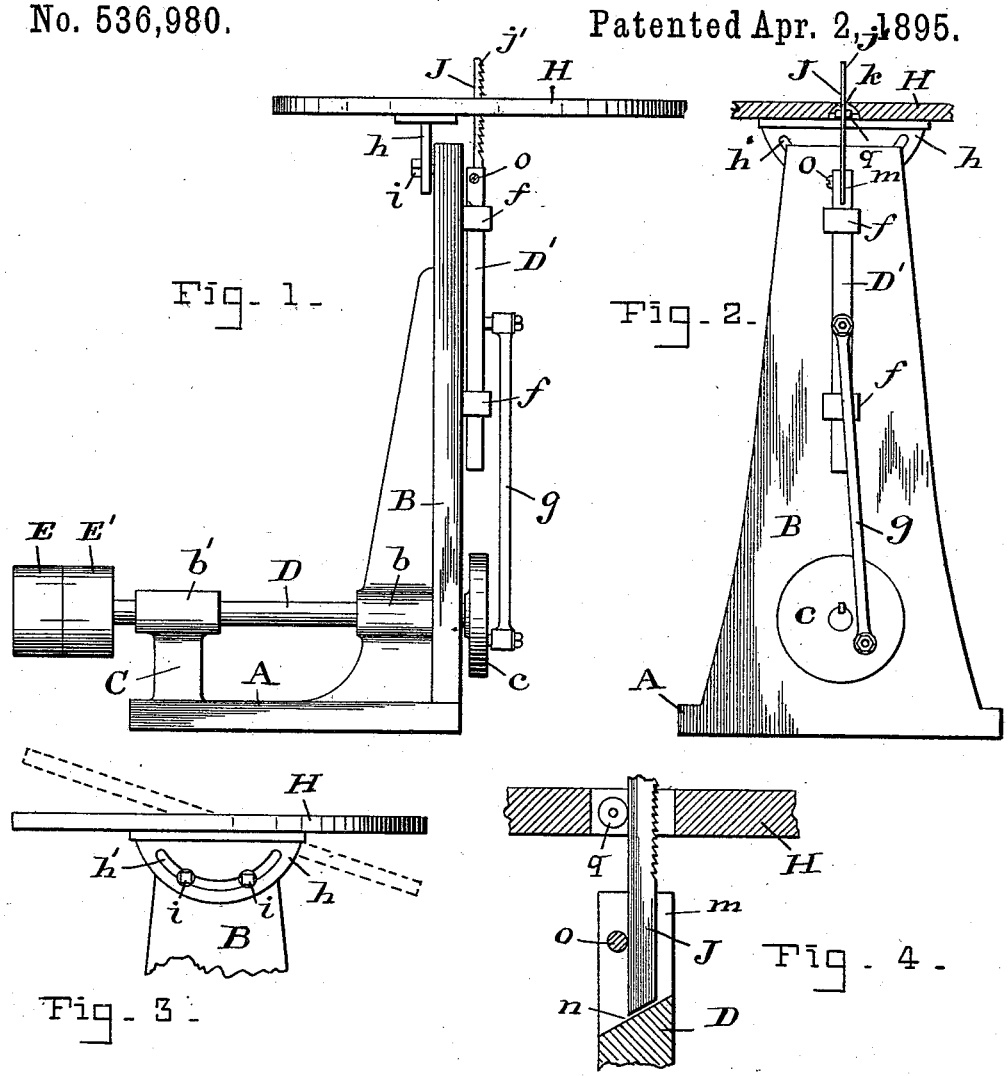
WITNESSES:
L. I. Van Horn.
Charles B. Mann Jr.
INVENTOR:
Jesse L. Wilson
By Chas. B. Mann
ATTORNEY.

UNITED STATES PATENT OFFICE.

JESSE L. WILSON, OF BALTIMORE, MARYLAND, ASSIGNOR OF ONE-HALF TO CHARLES T. HOLLOWAY, OF SAME PLACE.

SCROLL-SAW.

SPECIFICATION forming part of Letters Patent No. 536,980, dated April 2, 1895.

Application filed December 13, 1894. Serial No. 531,641. (No model.)

*To all whom it may concern:*

Be it known that I, JESSE L. WILSON, a citizen of the United States, residing at Baltimore, in the State of Maryland, have invented certain new and useful Improvements in Scroll-Saws, of which the following is a specification.

This invention relates to certain improvements in sawing machines of that type known as "scroll" or "jig" saws.

The object of the invention is to provide a sawing machine in which the upper end of the saw shall be free in order to admit of entering the saw-blade at the center of a piece of work to saw an interior scroll, without the necessity of detaching one end of the saw-blade, as is required in machines of ordinary construction.

In the accompanying drawings illustrating the invention,—Figure 1 is a side elevation view of a sawing machine embodying the invention. Fig. 2 is a front elevation and partial section of the same projected from Fig. 1. Fig. 3 is a detail rear view illustrating the adjustability of the work-table or platen. Fig. 4 is also a detail view illustrating the manner of attaching the lower end of the saw-blade to the vertical reciprocating bar. Fig. 5 is a plan view of a board or piece of work, illustrating an interior scroll such as this machine is capable of sawing.

In the accompanying drawings, the letter, A, designates the base part of the frame of the machine which may rest upon the floor, a table, or other suitable foundation. From one end of this base rises a vertical standard, B, having a shaft-bearing, b, near its lower end, and from the other end of the base rises a short post, C, also having a shaft bearing, b'. A horizontal shaft, D, is mounted in these bearings so as to revolve and is provided at one end with a crank-head, c, and the other end of the shaft has fast and loose pulleys, E, E', whereby power may be communicated to the shaft. A vertical reciprocating bar, D, works in guides, f, on the vertical standard, B, and a ·pitman rod, g, connects from the crank-head to the reciprocating bar. The saw, J, always maintains position in a direct vertical line.

The work-table or platen, H, is mounted upon the upper end of the vertical standard, B, in such manner that said table may be adjusted to take a position in an inclined or diagonal plane which is crosswise of, or transverse with respect to, the line of cut or kerf made by the saw, as will be understood by reference to Figs. 2 and 3. The work-table has a semi-circular plate, h, depending from its bottom. This plate is provided with a segment-shaped slot, h', which is concentric with respect to the narrow top part of the saw-slot, k. Bolts, i, passing through the segmental slot and into the vertical standard, B, secure the table to the standard. By loosening the bolts the table may be adjusted to any inclination, and then re-tightening the bolts will hold the table as desired by the operator.

The table is provided with a saw-slot which at its top part is in the form of a narrow passage at the upper surface of the table and flares or widens laterally at both sides in a direction crosswise of said narrow passage at the lower surface of the table. See Fig. 2. A grooveless roller, q, is journaled in the table and has position in the flared or wide part of the slot and each end extends laterally beyond the narrow top part of the slot. The rear edge of the saw, J, during its reciprocations bears against the roller, and said roller while allowing the saw to have free movement, braces it at its free end, and thereby tends to prevent breaking of the saw during the sawing operation. This construction of flared or widened saw-slot and roller in the flared part thereof is productive of an important result—it insures that a part of the roller will always bear against the vertical saw and brace it no matter whether the table is in a horizontal or inclined position.

The saw-blade, J, of the machine is mounted in such manner that it passes freely from below up through the saw-slot, k, in the table and its upper end, j', which has position above the table, H, is free and unconfined. When it is desired to saw or cut interior work in a board, there is no necessity of detaching the upper end of the saw from the yoke-arm. The saw-blade, J, is mounted on the upper end of the vertical reciprocating bar, D', which is forked by having a vertical slot, m, see Figs. 2 and 4, opening entirely through it.

The bottom of this slot is inclined, as at, n, in Fig. 4. The lower end of the saw-blade fits in the said slot and has a beveled or inclined termination which wedges against said inclined bottom. A screw, o, passes laterally through the two arms of the fork-slot and bears against the rear edge of the saw, and this screw causes the said two arms of the slotted end to clamp the saw and serves also as a fulcrum on the rear edge thereof, whereby, when strain comes on the upper free end of the saw, to cause the lower beveled termination of the saw to be wedged tightly against the inclined bottom of the slot. By this manner of securing the saw, the upper free end, $j'$, thereof always has position in a vertical line and is prevented from giving or yielding during the operation of sawing.

In operation the board, P, with the preliminary hole is placed on the work-table, H, the hole being slipped down over the free end, $j'$, of the saw-blade. With the saw reciprocating, the board, P, is then moved on the table so as to cause the saw to cut the scroll in accordance with the pattern thereof.

Having thus described my invention, what I claim as new, and desire to secure by Letters Patent, is—

1. In a scroll sawing machine, the combination of the frame carrying a vertically-reciprocating bar having its upper end forked by a slot opening entirely through it and the bottom of the slot inclined; a work-table on the said frame; a saw-blade having its lower end fitting in the said fork and provided with an inclined termination which wedges against the said inclined bottom of the fork-slot, and the upper end of the saw extending up through an opening in the work-table and being free and unconfined above the table; and a screw passed laterally through the two arms of the said fork of the bar and causing the said two arms to clamp the lower end of the saw and also serving as a fulcrum on the rear edge of the saw to cause the beveled termination of the saw to wedge tightly against the inclined bottom of the fork-slot when strain comes on the upper end of the saw.

2. In a scroll sawing machine, the combination of a vertically-reciprocating bar; a saw-blade secured by its lower end to said reciprocating bar and its upper end being free and unconfined and having vertical position; a work-table having a saw-slot which is in the form of a narrow passage at the upper surface of the table and which flares or widens laterally at both sides in a direction crosswise of said narrow passage at the lower surface of the table—and said table adjustable to take position in an inclined or diagonal plane which is crosswise of the line of the cut or kerf made by the saw; and a roller, $q$, journaled in the flared or widened part of the saw-slot and each end extending beyond the narrow part of the slot and said roller bearing against the rear edge of the saw, whereby the saw will always be braced by the roller whether the table is horizontal or inclined, substantially as described.

In testimony whereof I affix my signature in the presence of two witnesses.

JESSE L. WILSON.

Witnesses:
CHARLES B. MANN, Jr.,
C. CALVERT HINES.